United States Patent
Ramakrishnan et al.

(10) Patent No.: US 6,931,251 B2
(45) Date of Patent: Aug. 16, 2005

(54) SYSTEM AND METHOD OF CALL ADMISSION CONTROL IN A WIRELESS NETWORK

(75) Inventors: Kajamalai G. Ramakrishnan, Tewksbury, MA (US); Murali Aravamudan, Windham, NH (US); Shamim A. Naqvi, Morristown, NJ (US); Depankar Neogi, Wilmington, MA (US); Sundar Rangamani, Windham, NH (US)

(73) Assignee: Motorola, Inc., Schaumburg, IL (US)

( * ) Notice: Subject to any disclaimer, the term of this patent is extended or adjusted under 35 U.S.C. 154(b) by 165 days.

(21) Appl. No.: 10/310,329

(22) Filed: Dec. 5, 2002

(65) Prior Publication Data

US 2004/0110507 A1 Jun. 10, 2004

(51) Int. Cl.$^7$ .............................................. H04Q 7/20
(52) U.S. Cl. .................... 455/445; 455/450; 455/452.1; 455/453
(58) Field of Search ................................. 455/445, 450, 455/452.1, 453, 436, 403, 509, 438, 443; 370/468, 230, 252, 477, 229, 235, 232, 238

(56) References Cited

U.S. PATENT DOCUMENTS

| | | | | | |
|---|---|---|---|---|---|
| 5,884,174 | A | * | 3/1999 | Nagarajan et al. | 455/436 |
| 6,314,293 | B1 | * | 11/2001 | Servi et al. | 455/450 |
| 6,331,986 | B1 | * | 12/2001 | Mitra et al. | 370/468 |
| 6,788,646 | B1 | * | 9/2004 | Fodor et al. | 370/230 |
| 2002/0004379 | A1 | * | 1/2002 | Gruhl et al. | 455/403 |
| 2003/0112762 | A1 | * | 6/2003 | Mahmoud et al. | 370/252 |

* cited by examiner

*Primary Examiner*—Erika A. Gary
*Assistant Examiner*—Huy D Nguyen

(57) ABSTRACT

Methods and systems for providing fine grain call admission control into a communication network are disclosed. Under some embodiments, the fine grain control maximizes profitability of calls serviced by the network on a call class basis.

5 Claims, 3 Drawing Sheets

SYSTEM AND METHOD OF CALL ADMISSION CONTROL IN A WIRELESS NETWORK

BACKGROUND

1. Field of the Invention

This invention relates to wireless wide area networks and, more particularly, to call admission control in such networks.

2. Discussion of Related Art

Subscribers are adopting wireless communications in increasingly large numbers. Wireless wide area networks service such calls via Mobile Switching Centers (MSC's), other switches, and other components.

To keep the MSCs and other switches from getting overloaded, the admission of new calls is controlled via a process known as "Call Admission Control." In this fashion, some guarantee on call processing delay can be given to a very large percentage of the calls processed by the switch. For example, a quality of service (QoS) metric may be established (e.g., calls will suffer less than 200 ms of call setup latency), and through the control of new calls, the QoS metric can be guaranteed for call setups in progress. Call admission control involves reducing (or throttling) the call arrival. In short, with call admission control some calls are dropped before processing rather than potentially saturating the system by attempting to handle the call.

A conservative call admission control policy can prevent the switch from getting overloaded but at the expense of throughput. An aggressive call admission control policy can increase the throughput but may be unable to meet the QoS metric (as a consequence of not detecting congestion fast enough).

In a distributed system, throttling can be implemented in multiple ways based on the ability of the peer entity and the communication protocol among the entities. For example, the peer entity may be capable of receiving explicit feedback through the control/signaling protocol to reduce the call rate or the peer entity may have to implicitly infer from expired timers for calls that were not responded to by the switch. Some systems may effectively look at the most utilized component (i.e., the closest to being saturated) and throttle the calls accordingly.

To control call admissions, software logic is typically used to determine when the number of calls arriving into the switch or MSC is in danger of saturating the switch. The call admission control logic will "drop calls" to prevent such saturation. To date, many call admission control policies have been ad hoc. There is a need in the art for an improved method and system for controlling call admissions to the network.

SUMMARY

The invention provides methods and systems for providing fine grain call admission control into a communication network.

According to one aspect of the invention, the fine grain control maximizes the aggregate revenue for the service provider.

According to another aspect of the invention, an allocatable call admission budget for the communication network is obtained. A set of call classes for the communication network are identified in which each class has a corresponding call arrival rate, revenue and cost. For each call class a corresponding profitability metric is determined. A corresponding throttling fraction is determined for each call class in which the throttling fraction is a function of the profitability metric and the allocatable call admission budget. The throttling fractions for each class are provided to a call admission control server to throttle calls for each class accordingly.

Under another aspect of the invention, the call arrival rate is a historical metric.

DETAILED DESCRIPTION

Preferred embodiments of the invention provide a method and system for controlling call admissions to a switch in a wireless wide area network using fine grain control. Under certain embodiments, the calls are characterized according to classes, and each class has a corresponding metric to be optimized. For example, the metric may be revenue to the service provider, or it may be a ratio of revenue to cost of servicing such a class of call (i.e., profitability metric). Optimal throttling rates for each class of calls may be calculated accordingly to thus provide improved revenue to the service provider. Under one preferred embodiment, throttling fractions are determined based on the arrival rates $\lambda_i$ of the corresponding classes of calls, the metric to be optimized r, and the processing cost S of the call. These parameters are considered in view of an upper bound of utilization—a level which if exceeded may result in saturation of the switch or which may hinder satisfaction of QoS guarantees. The throttling fractions are then used by the call admission control logic to throttle calls according to their class.

Figure 1:
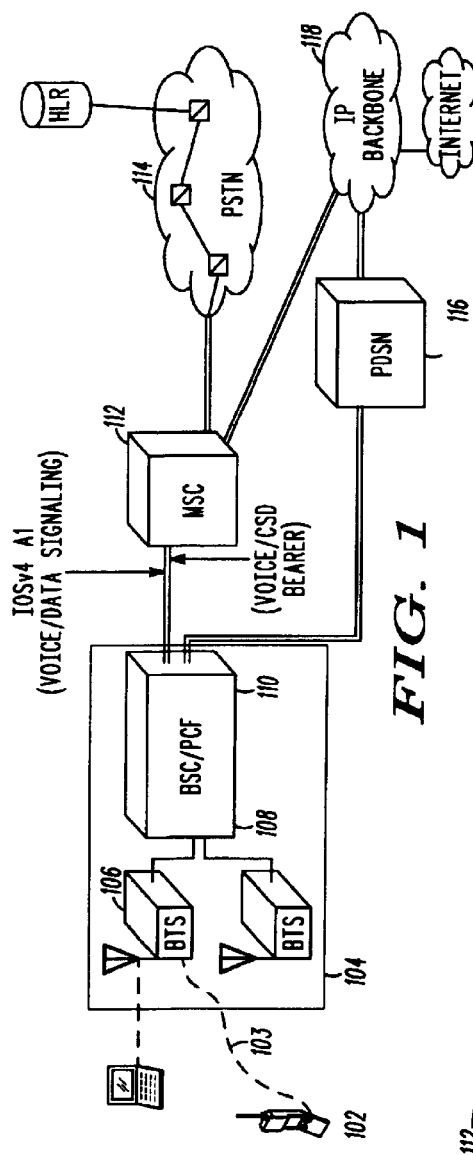
FIG. 1 is a system diagram of an exemplary wide area wireless network.

FIG. 1 illustrates an exemplary wireless wide area network in which embodiments of the invention may be realized. The specific example of FIG. 1 is a simplified 3G network in accordance with the CDMA 2000 proposal, but persons skilled in the art will appreciate that the invention may be realized in any telecommunication network utilizing call admission control policies.

In the exemplary network, mobile stations 102 communicate over an air interface 103 with a radio access network (RAN) 104. The RAN 104 includes Base Transceiver Stations (BTS) 106 that are in radio contact with the mobile stations and that are in fixed line communication with a Base Station Controller (BSC) 108. The BSC 108 controls the radio equipment used to communicate with the mobile stations. This function is collectively referred to as Radio Resource Management, and it encompasses the management of handoffs of the roaming mobile stations 102 within a BSC and the allocation of radio channels for both voice and data traffic.

The RAN 104 communicates with a Packet Data Serving Node (PSDN) 116 which in turn communicates with IP Backbone 118.

The BSC communicates with a Mobile Switching Center (MSC) 112, which is a standard Local End Office with enhanced call processing software (including mobility management) and (optional) hardware that can perform transcoding and rate adaptation functions. For example, certain embodiments of the invention may use the MSC described in U.S. patent application Ser. No. 09/721,329 filed on Nov. 22, 2000 (which is hereby incorporated by reference in its entirety) and assigned to the assignees of the present invention with the modifications described herein. Likewise, other MSCs may be used with the modifications described herein.

Typically, signaling information between the BSC and the MSC is conveyed in accordance with a predefined protocol, and voice/data is conveyed over bearer circuits in accordance with other protocols. Among other things, the MSC 112 provides mobility management functionality. This function consists of management of mobile station parameters such as the location of a mobile station, mobile identity and authentication. Handoffs between BSC's and between MSC's are controlled by the MSC. The MSC communicates with the Public Switched Telephone Network (PSTN) 114 using known signaling and bearer circuit protocols.

The Mobile Switching Center (MSC) receives call setup requests from mobile users via the RAN and incoming call requests from other PSTN endpoints to mobile users. The actual signaling interfaces and the associated signaling protocols depend on the specific network topology. For example in a CDMA 2000 network, outgoing calls from mobile subscribers in a MSC area arrives at the MSC through the IOS/IS-634 signaling interface from the RAN, whereas incoming calls from the PSTN arrive through ISUP protocol. In next generation systems, call set-up requests may also arrive at the MSC from the PDSN originating from either IP-enabled handsets or newer generation RANs that generate IP traffic (both signaling and bearer). The specific computing task performed by the MSC depends on the signaling protocol, call type, caller/callee information etc. The aggregate computational resource usage of the MSC depends on the call arrival rates at each signaling interface.

Figure 2:
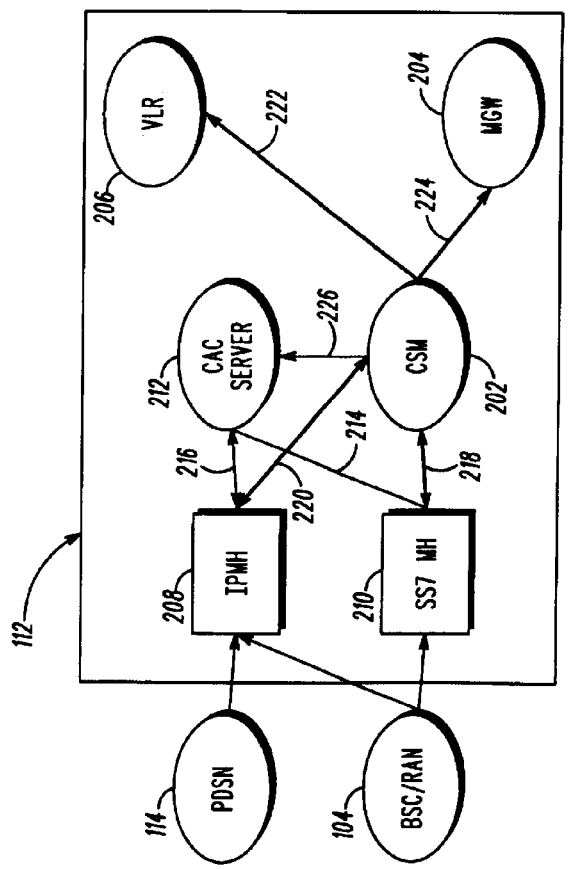
FIG. 2 is a diagram illustrating network and switch components that may lead to congestion or saturation of a network switch.

FIG. 2 shows a simplified architectural diagram of select internal software modules of an exemplary MSC 112. The simplified diagram is used to help illustrate the numerous types of call arrivals that are handled by a switch 112 and that are a potential source of saturation of the switch.

The architecture includes an IP Message Handler (IPMH) 208, which handles messages from a PDSN or a new generation RAN that generates IP traffic, a SS7 Message Handler 210 which handles SS7 messages from BSC/RAN 104, a Communications Session Manager (CSM, more below) 202, a Visitor Location Register (VLR) 206, a Media Gateway (MGW) control process 204, and call admission control (CAC) server 212.

The IPMH 208 and SS7 Message Handler 210 each handle messages from their associated links under the control of the CSM 202 and CAC Server 212. In relevant part, the CAC Server sends control messages via software communication channels 214, 216 to instruct the message handlers about various throttling rates for specific classes of calls. The message handlers in turn throttle incoming calls accordingly. For example, if the IPMH 208 were instructed to throttle 20% of calls of a certain class, under certain embodiments the IPMH would randomly throttle 20% of such calls by effectively preventing such calls to be "set-up" or established. The message handlers also use the communication channels 214, 216 to convey various forms of statistical information to the CAC Server 212.

The CSM 202 terminates the signaling protocols and performs the session and mobility management functions. To do so, the CSM communicates to the message handlers 208, 210, the VLR 206, and the MGW via communication channels 218, 220, 222, and 224.

The VLR 206 performs subscriber record lookups for all active subscribers at the MSC 112.

The MGW control process 204 sends commands to the media gateway that control the termination and switching of the actual bearer (voice/data) traffic.

The CAC Server 212, in relevant part, is responsible for call admission control of the system. The CAC Server, of certain embodiments, is implemented as a module as part of an Operations, Administration, Management, and Provisioning system (OAM&P, more below). It includes logic (more below) to compute throttle functions in an efficient way. The throttle functions are used to control the throttling for a next measurement window (which may be controlled in a variety of ways, e.g., periodically or only when certain thresholds are reached). The throttle functions (or values) are conveyed to the message handlers, e.g., IPMH 208, so that they may actually perform such throttling. As explained below, the throttling functions may be associated with classes of calls that the message handlers may discriminate. Under certain embodiments, the throttling functions are determined via an optimization procedure such as one to optimize a profitability metric for the system. Other methods of determining throttling functions may also be used, which might provide improvements to such metrics, but perhaps sub-optimally. Under certain embodiments, the CAC Server collects various statistics from the message handlers and the CSM via channels 214, 216 and 226. The CAC Server may also implement smoothing logic (more below) to determine certain relevant statistics such as smoothed arrival rates of various classes of calls.

Figure 3:
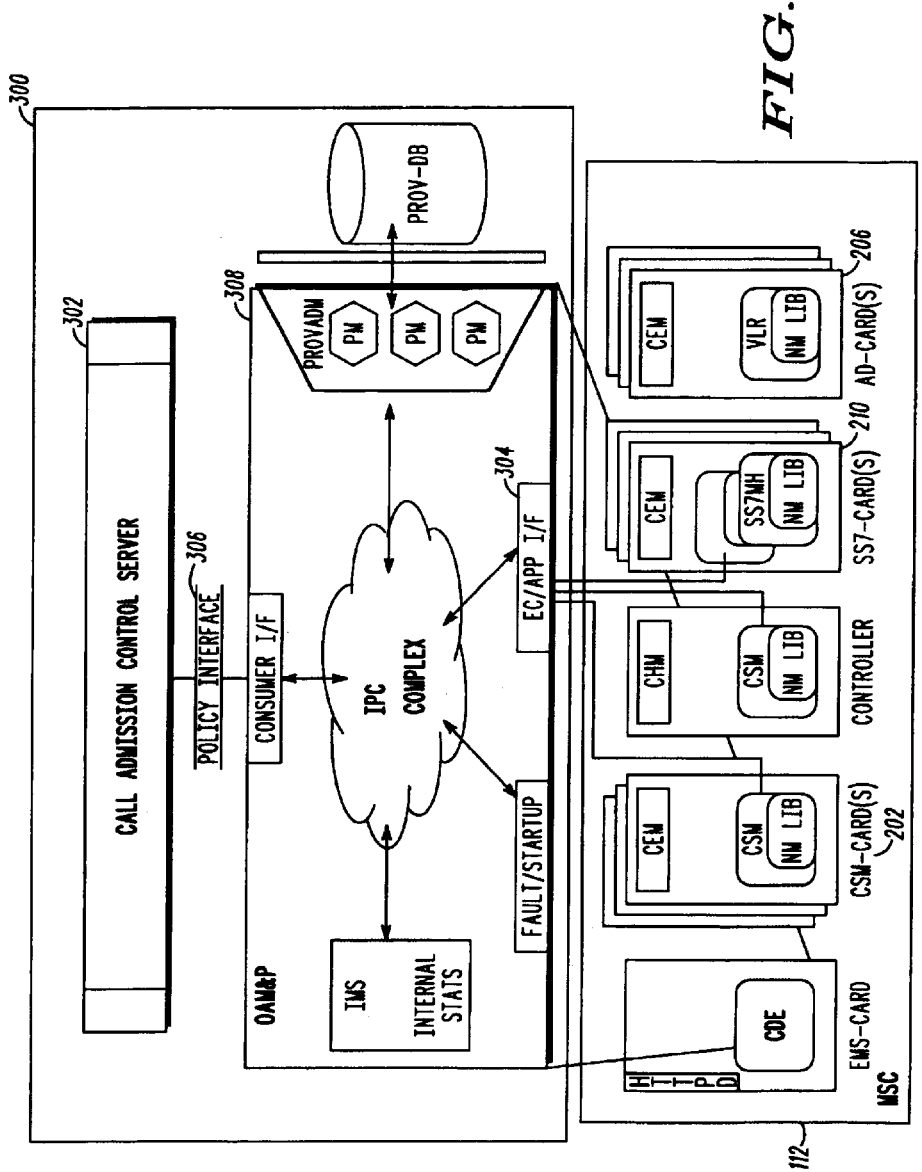
FIG. 3 is a diagram of a network management server according to certain embodiments of the invention.

FIG. 3 shows an exemplary switch architecture including select hardware components and illustrating the layered nature of an exemplary software architecture. In this instance, call admission control logic is implemented in a call admission control server 302, which is part of a network management server 300. The CAC server 302 obtains event detail records from an Event Collector 304 in the network management server 300. The Event Collector receives event detail records from the individual hardware modules of the switch 112, and in this fashion may collect various forms of statistics. For example, as illustrated, the CAC Server may collect statistics, for example, from the SS7 signaling module 210 and the CSM module 202. The network management server also accepts network configuration parameters and certain of these may be conveyed to the CAC Server 302. For example, under certain embodiments, an upper bound UB of switch utilization may be provided by an administrator. The utilization in turn may be a form of measure or calculation of various monitored performance statistics, e.g., memory and CPU utilization at the switch, queue length and delay, etc.

The CAC server 302 enforces throttling control through a Policy Interface 306 exposed by the OAM&P system 308. For example, the CAC Server may calculate various throttling functions for various classes of calls and convey such to the appropriate message handlers and modules, e.g., IPMH 208 SS7 MH 210. Thereafter, the message handlers may analyze each incoming call to determine its corresponding class and subject it to its throttling logic, e.g., dropping certain fractions of calls in some way, e.g., weighted random dropping.

For example, for a given throttling fraction $\tau_i$, where 'i' is the class of call, the throttling logic within the CAC Server will calculate or determine a corresponding function and will instruct the appropriate message handler to permit only that fraction of calls for that class to be admitted. The message handler will drop other calls within the corresponding time window (i.e., the intervening time before a subsequent control message is received by the message handler).

One embodiment of the logic uses the following parameters to determine corresponding throttling values:

P is the number of revenue classes in consideration $\tau_i$ is the throttle value associated with class i and by definition is greater than or equal to zero and less than or equal to one $\lambda_i$ is a smoothed estimate of the arrival rate for calls of class i (more below regarding smoothing)

$r_i$ is the revenue per call associated with class i $S_i$ is the cpu time required (or more generically the "cost") to set up calls of type i UB is an upper bound on the utilization of the switch, which preferably should not be exceeded, to honor QoS delay requirements on call setup The total revenue generated over all the classes P of calls may be represented with the following equation. Consequently, maximizing the following equation maximizes revenue.

$$\sum_{i=1}^{P} r_i \tau_i \lambda_i$$

However, though service providers will desire to maximize the above revenue equation, they should maintain the following constraint to satisfy QoS. The constraint effectively states that the cost on the system should be less than the pre-established upper bound (UB).

$$\sum_{i=1}^{P} S_i \lambda_i \tau_i \leq UB$$

One efficient way to solve the above is to transform the throttling variable with a new variable. Specifically, by defining a new, transform variable $\tau_i^*$ according to the following equation $$\tau_i^* = \lambda_i S_i \tau_i$$

and substituting $\tau_i^*$ into the total revenue equation, the maximization problem may be restated as follows:

$$\max \sum_{i=1}^{P} \frac{r_i}{S_i} \tau_i^*$$

subject to the constraints that:

$$\sum_{i=1}^{P} \tau_i^* \leq UB$$

where $0 \leq \tau_i^* \leq \lambda_i S_i$ and $1 \leq i \leq P$.

Various values for $\tau_i^*$ may then be found by solving the system of equations, and the $\tau_i^*$ may transformed back to $\tau_i$ which may then be used in control messages to the message handlers, as outlined above.

Figure 4:
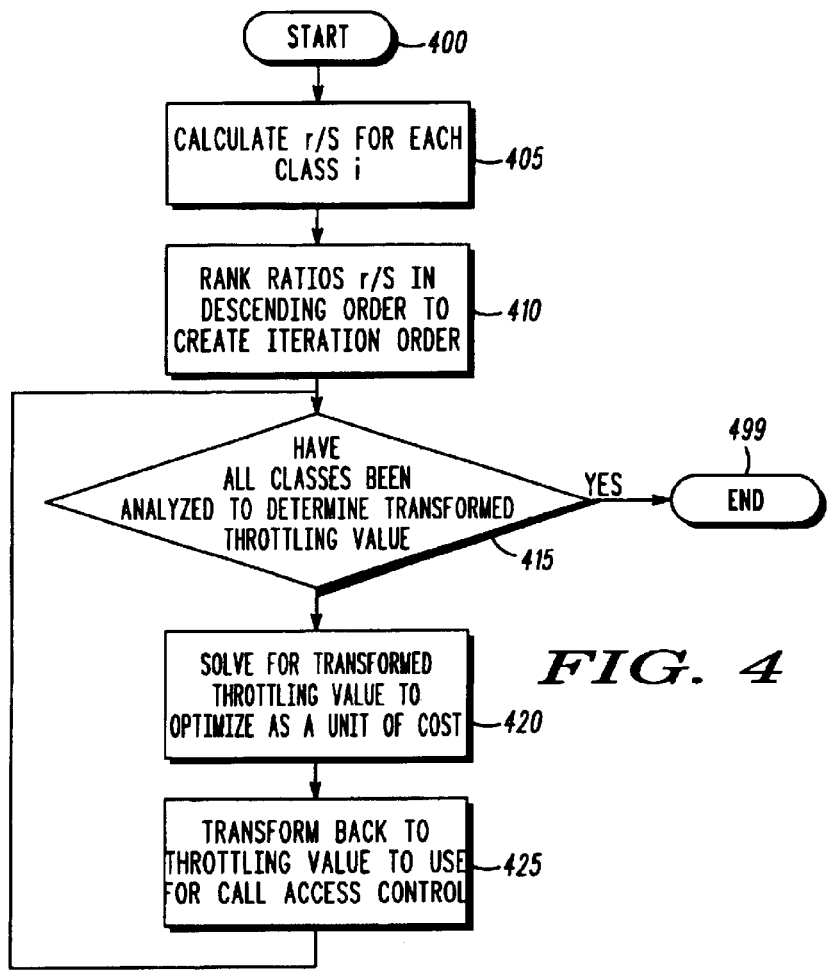
FIG. 4 is a flow chart illustrating logic for calculating of throttling rates according to certain embodiments of the invention.

FIG. 4 is a flow chart showing exemplary logic for solving $\tau_i^*$ according to one embodiment of the invention. The logic starts in 400 and proceeds to 405 in which the metric being optimized (e.g., revenue, $r_i$) is divided by its corresponding cost $S_i$, for each class. In 410 the ratios are ranked in descending order. When the metric r is revenue, the ratios and descending order correspond to a ranking of corresponding revenue per unit cost for each class. In 415, a check is made to determine whether the $\tau^*$ have been determined for all classes. If they have the logic ends in 499. Until the last class (with the lowest ratio) is analyzed to determine its corresponding $\tau^*$, the logic will flow through the "No" branch and proceed to 420. In 420, the following equation is solved for the current class $i_k$ being considered:

$$\tau_{i_k}^* = \min\left(UB - \sum_{l=1}^{k-1} \tau_{i_l}^*, \lambda_{i_k} S_{i_k}\right)$$

If one thinks of UB as the budget that may be allocated, this equation effectively determines if the budget allows the current class to be fully serviced, in which case the class i will have its $\tau^*$ allocated its corresponding $\lambda_i S_i$. But, if the full amount needed to serve the class being considered cannot be granted, then the allocation gives the class as much of the resources as remains (i.e., the upper bound minus the summation of all previously allocated $\tau^*$).

In 425, the $\tau^*$ are transformed back to $\tau$ values which may then be utilized by the call admission control logic 302 to instruct corresponding message handlers accordingly. The logic then loops back to 415 to consider the next class in the metric per unit of cost order.

In this embodiment, the call access control policy imposes one QoS constraint on all classes of calls. The estimated throttling factors are also non-preemptive and static. In alternate embodiments, it is possible to add utilization constraints specific to each call type. It is also possible to implement dynamic throttling with call preemption. By doing this, lower revenue producing calls in progress can be preferentially dropped for higher revenue producing calls under a utilization bound restriction.

Figure 5:
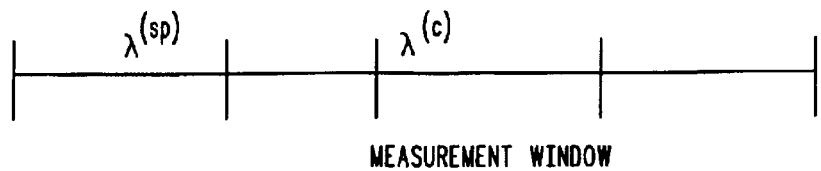
FIG. 5 illustrates call arrival rates and smoothed call arrival rates.

In some embodiments, it may be preferable to use a statistically smoothed call arrival rate for the various $\lambda$. FIG. 5 illustrates call arrival measurement windows used for determining throttling values in certain embodiments. The length of the measurement windows should be long enough to represent a reasonably good statistical sampling period. $\lambda^{(c)}$ is the call arrival rate at the current arrival window. In order to avoid false alarms or missed congestion, it is imperative to smooth the call arrival rate by taking into account the current arrival rate and the arrival rates of past measurement windows. In this case, $\lambda^{(sc)}$ represents the smoothed arrival rate of the current window and $\lambda^{(sp)}$ represents the smoothed arrival rate of the past arrival window.

The smoothed arrival rate of the current window is modeled by the equation:

$$\lambda^{(sc)} = w_c \lambda^{(c)} + w_p \lambda^{(sp)}$$

where $w_c$ and $w_p$ represent the weighing factors for the current and past windows and should add to 1. The weights may be set and re-established by the system. For example, $w_c$ may be set to 0.8 and $w_p$ may be set to 0.2. Of course, other forms of exponential smoothing may be employed. In addition the call arrival rates may be based on historical statistics. For example, the rates may be set to correspond with the time of day or the time of year.

At end of current window, the smoothed arrival rate of the past window should be approximately equal the arrival rate of the current window as modeled:

$$\lambda^{(sp)} \cong \lambda^{(c)}$$

Thus, using the above approach and assuming that the optimizable metric is revenue, calls from a class having higher revenue per unit cost may be throttled differently than calls from a class with lower revenue per unit cost. Also, since cost is factored into the analysis, it may not be the case that calls with simply the highest revenue are prioritized.

Analogously, the call throttling may consider other criteria such as priority. For example, emergency calls may have special throttling procedures to allow the calls through. As an example of revenue classes, consider two types of customers: Type 1 customer has a monthly flat subscription fee and is allowed "unlimited" number of calls during the month. Thus the per call revenue for the service provider is 0, since the call is free. Type 2 customer is not a member of this flat fee and pays a premium revenue on a per call basis.

One of the main aspects of the above embodiments is the formulation of the "revenue-based" call admission control as a linear programming problem (LP). The decision variables of the LP are the throttle values for the various revenue classes. Another key aspect of the above embodiments is the simple linear algorithm to determine the "optimal" solutions to the LP. Traditionally LPs are solved using algorithms that are high degree polynomials in computational complexity. In several described embodiments, however, such computational complexity is avoided, thus reducing load and enhancing efficiency of the MSC or switch.

At certain points in the description above, logic was described which created a throttling function. This terminology was used to show that the actual determination of a throttling value may be distributed in many ways. For example, the CAC Server may have logic to partially or fully determine the value. In the former case, the final determination may be made by a corresponding message handler.

The above embodiments provided throttling fractions in various ways. One preferred embodiment, for example, calculated optimal, or near optimal values, using a linear programming approach. Alternative embodiments however may provide throttling fractions in other ways. For example, throttling fractions may be provided by a look-up table in which all or a subset of the above parameters, e.g., arrival rates, and class, may be indices into the table or other data structure.

It will be further appreciated that the scope of the present invention is not limited to the above-described embodiments, but rather is defined by the appended claims, and that these claims will encompass modifications of and improvements to what has been described.

What is claimed is:

1. A method of controlling call admissions in a communication network, comprising:
   identifying a set of call classes for the communication network, wherein each class has a corresponding call arrival rate, revenue, and cost;
   for each call class determining a corresponding profitability metric;
   assigning a corresponding throttling fraction for each call class; and
   allocating a call admission budget and defining an unallocated call admission budget as the allocated call admission budget minus a transformed throttling fraction of any class for which the transformed throttling fraction has been assigned, and wherein in descending order starting from the class having the highest profitability metric and proceeding through the class with the lowest profitability metric, the transformed throttling fraction for each class is determined as a minimum of unallocated call admission budget and the product of call arrival rate and cost for the corresponding class.

2. The method of claim 1 wherein each call class has a corresponding revenue metric per call and the profitability metric is the revenue metric divided by the corresponding cost.

3. The method of claim 1 wherein the call arrival rate is a smoothed average call arrival rate.

4. The method of claim 1 wherein the call arrival rate is a historical metric.

5. The method of claim 1 wherein the act of assigning a corresponding throttling fraction $\tau_i$ for each call class i includes the acts of
   modeling the allocation of resources as a linear programming problem, in which the throttling fraction $\tau_i$ for each call class i are decision variables of the linear programming problem, and wherein the linear programming problem is solved by transforming the throttling fractions to a transformed throttling fraction $\tau_i^*$ according to the equation $$\tau_i^* = \lambda_i S_i \tau_i$$

wherein $\lambda_i$ is an estimate of a call arrival rate for class i and $S_i$ is an estimate of cost to service a call in class i.

* * * * *